(No Model.)

C. B. BRIERLY.
ORE AMALGAMATOR.

No. 503,034. Patented Aug. 8, 1893.

Witnesses
B. S. Ober
L. P. Wolhaupter

Inventor
Conant B. Brierly,

By his Attorneys,
C. A. Snow & Co.

UNITED STATES PATENT OFFICE.

CONANT BODOIN BRIERLY, OF BOISE CITY, ASSIGNOR OF ONE-HALF TO ABRAHAM FRIEDLINE, OF MOSCOW, IDAHO.

ORE-AMALGAMATOR.

SPECIFICATION forming part of Letters Patent No. 503,034, dated August 8, 1893.

Application filed March 23, 1893. Serial No. 467,368. (No model.)

*To all whom it may concern:*

Be it known that I, CONANT BODOIN BRIERLY, a citizen of the United States, residing at Boise City, in the county of Ada and State of Idaho, have invented a new and useful Ore-Amalgamator, of which the following is a specification.

This invention relates to ore amalgamators: and it has for its object to provide an improved amalgamating device adapted to be used in connection with ordinary ore sluices, so as to provide simple and efficient means whereby float or flour gold can be collected, such gold owing to its light specific gravity and not settling, being usually lost in sluicing and in the ordinary amalgamators.

With these and many other objects in view which will readily appear as the nature of the invention is better understood, the same consists in the novel construction, combination and arrangement of parts hereinafter more fully described, illustrated and claimed.

Figure 1:
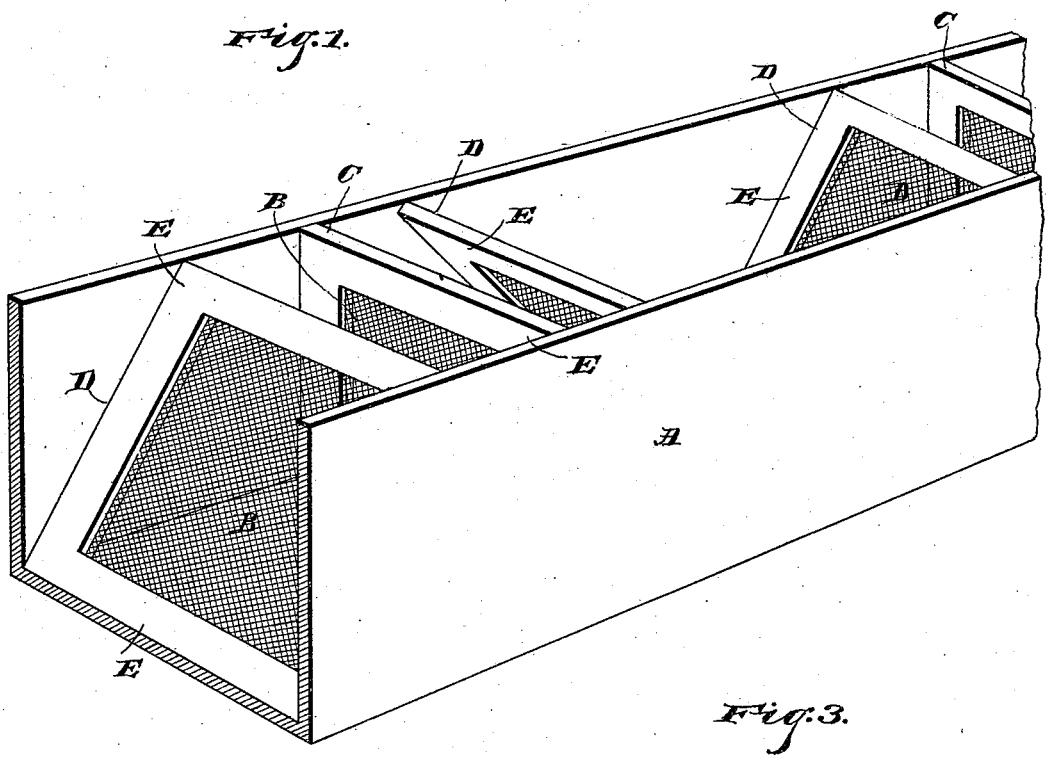
Figure 2:
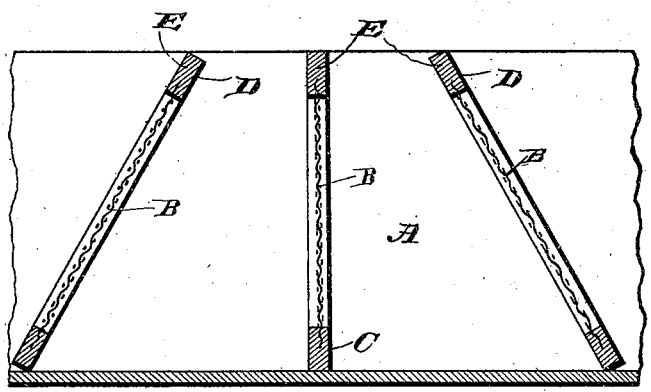
Figure 3:
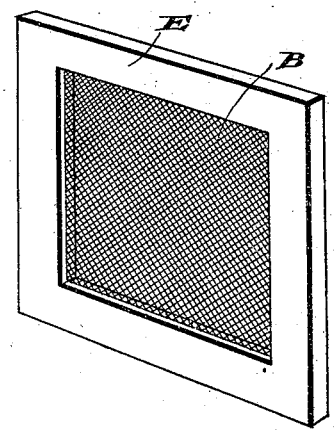

In the accompanying drawings:—Figure 1 is a perspective view of a sluice having my improved amalgamating screens arranged therein. Fig. 2 is a vertical longitudinal sectional view of the construction shown in Fig. 1. Fig. 3 is a detail in perspective of one of the amalgamating screens.

Referring to the accompanying drawings, A represents a sluice of ordinary construction in which are arranged groups of amalgamating screens B. Each group of screens comprises a central vertically arranged screen C, extending transversely across the sluice from the top to the bottom thereof and the inclined screens D, disposed at opposite angles on both sides of the vertical screen C, thus providing an arrangement and disposition of screens whereby every particle of float or flour gold held in suspension in the liquid passing through the screens must necessarily come in contact with the metal of said screens so as to be collected thereon. The angled disposition of the side screens D, is such as to collect a certain quantity of the float gold before it reaches the central screen C, and such gold as may pass the central screens C. It will be apparent that by reason of disposing the side screens D, at an angle on both sides of the central vertical screens C, provision is made whereby the floating gold in suspension within the water is more effectively collected, since the water in passing through an inclined screen must necessarily have a greater contact with the body thereof than it would have through a perfectly vertical screen, through the meshes of which water will run directly without any material check. The floating or flour gold held in suspension by the sluice water will therefore be more apt to be brought in contact with the metallic body of the first inclined screen than to pass directly through the meshes of said screen, but such gold as does pass through the first inclined screen has another opportunity of being caught by the central vertical screen, and in order to insure the collection of such gold as may possibly pass through the first inclined screen and the central screen, a second screen is disposed at an angle opposite to that of the first screen in order to present a reversely disposed obstruction to the straight flow of water and the floating gold. Furthermore it will be obvious that the angled disposition of certain screens of each group provide means for collecting such gold as may have a tendency to settle toward the bottom, and which gold a vertical screen would not collect. Each of the screens are secured in the screen frame E, and are made of a suitable mesh of copper wire. The copper wire composing each screen is in the first place silver plated, in order to secure a perfect coating of amalgam or mercury, so that the said screens will effectually collect floating gold, inasmuch as the same must necessarily become amalgamated thereon.

From the foregoing it is thought that the construction and many advantages of the herein described amalgamator will be apparent to those skilled in the art.

Having thus described my invention, what I claim, and desire to secure by Letters Patent, is—

1. The combination with a sluice box, of a series of wire screens arranged in said sluice box and having combined silver-plated and amalgamated surfaces, substantially as set forth.

2. The combination with a sluice box; of separate groups of amalgamated metal screens arranged in said sluice box, each group of screens comprising a central vertically arranged screen, and inclined screens disposed at opposite angles on both sides of the vertical screen, substantially as set forth.

3. The combination with a sluice box; of separate groups of silver plated and amalgamated copper wire screens arranged in said sluice box, each group of screens comprising a central vertically arranged screen, and inclined screens disposed at opposite angles on both sides of the vertical screen, substantially as set forth.

In testimony that I claim the foregoing as my own I have hereto affixed my signature in the presence of two witnesses.

CONANT BODOIN BRIERLY.

Witnesses:
E. J. CURTIS,
WM. B. KNOTT.